United States Patent [19]

Abel et al.

[11] 3,862,424

[45] Jan. 21, 1975

[54] OPTO-ELECTRONIC METHOD FOR THE SCANNING OF TERRAIN PROFILES AND A SWITCHING ARRANGEMENT FOR EFFECTING THE METHOD

[75] Inventors: Konrad Abel, Ketsch; Hans Seibecker, Baiertal; Guenter Wichmann, Leimen, all of Germany

[73] Assignee: Eltro GmbH, Heidelberg, Germany

[22] Filed: Oct. 11, 1973

[21] Appl. No.: 405,656

[30] Foreign Application Priority Data
Oct. 13, 1972  Germany............................ 2250251

[52] U.S. Cl. ............................................... 250/349
[51] Int. Cl. ............................................... G01t 1/16
[58] Field of Search ........... 250/253, 339, 340, 342, 250/347, 348, 349, 353; 73/355 R

[56] References Cited
UNITED STATES PATENTS

| | | | |
|---|---|---|---|
| 3,056,958 | 10/1962 | Anderson........................ | 250/339 X |
| 3,278,746 | 10/1966 | Fiat.................................... | 250/253 |
| 3,448,267 | 6/1969 | Blythe et al. ...................... | 250/353 |

Primary Examiner—Eli Lieberman
Assistant Examiner—Davis L. Willis
Attorney, Agent, or Firm—Waters, Roditi, Schwartz & Nissen

[57] ABSTRACT

An opto-electronic method and switching arrangement for scanning terrain profiles including geometrically and thermally high-resolution line scanning apparatuses, notwithstanding their use of known specific sensors with finite time constants, so as to attain a high degree of sensitivity and to furthermore create the possibility to allow for the conversion of an apparatus having a single sensor for the purpose of an increase in its capability, without any extensive requirements. Detector lines are arranged so as to extend in parallel with the scanning direction, and in which there are provided between individual detectors, suitable connecting means in the form of delay elements. An apparatus having single detectors may be converted without the need for an optical corrector or mechanical reconstruction. The delay time may be correlated with the scanning speed of the optical system, or the latter with the delay time of the detector line scanner.

15 Claims, 2 Drawing Figures

OPTO-ELECTRONIC METHOD FOR THE SCANNING OF TERRAIN PROFILES AND A SWITCHING ARRANGEMENT FOR EFFECTING THE METHOD

FIELD OF THE INVENTION

The present invention relates to an opto-electronic method for the plotting of temperature distribution across terrain sectors, in the form of a temperature-entropy diagram with the aid of a line scanning detector arrangement, and furthermore relates to a switching arrangement for carrying out the inventive method.

The system is adapted for utilization in aircraft or airborne reconnaissance missiles, in which the arrangement, as is generally known, consists of a scanning unit, an electronic amplifying and plotting element, and a recorder unit with a film cassette. This system is hereinbelow referred to as an IR-linescan-system (IRLS).

DISCUSSION OF THE PRIOR ART

Until recently IRLS-systems have been known which operate with a single optical-electronic receiving element. The heat radiation of the overflown terrain is hereby focused, through the use of one or more planar mirrors and one or more fixed deflecting mirrors, as well as an IRLS-objective system, onto the optical-electronic receiving element, and by means the latter optical-electronic converter transformed into electrical signals. The amplified electronic signals serve to control the light intensity of a special lamp or cathode ray tube which, by using one or more rotatable optical systems, or respectively, an electron beam inclined perpendicularly to the path of movement of the film, in a stripwise manner plots the temperature-entropy diagram of the terrain sector on the film.

In these IRLS-systems there may be scanned, for example, through the use of rotating square prism, four sequential terrain sectors or strips for each complete revolution of the prism. The width of a terrain sector is determined by the image angle of the IR-objective system and the flight altitude of the surveillance missle, while its length is determined by the scanning angle of the system.

In order to render possible the continuous plotting of the terrain, for a predetermined width of the scanned terrain sector the rotational velocity of the mirror system and the flying speed of the reconnaissance missile must be in synchronism above the ground. This results in that, upon utilization of that type of IRLS-systems in rapidly flying missiles, high rotational speeds become necessary. However, high rotational speeds of the rotating mirror have the disadvantage that only a very short period of time remains for the scanning of the surface portions of the terrain sector through the IR-optical system of the IRLS-scanning unit, whereby only a very low degree of radiated heat energy for each unit of surface is received by the receiving element. Consequently, the lower limit of the resolvable temperatue differential of the temperature-entropy diagram is upwardly displaced, in effect meaning that an increase of the scanning speed results in a deterioration in the temperature resolution. Due to this reason, and since the IR-receiving element possesses a finite time constant, through IRLS-systems which operate with a single receiver element, there cannot be obtained high temperature resolutions for the temperature-entropy diagrams for rapidly flying reconnaissance missiles, inasmuch as these are considerably reduced in weight and volume.

Pursuant to a method, and system for carrying out the method as has become known from German Patent No. 1,623,425, the received heat radiation is distributed over a plurality of identical receiver elements which, subsequent to an opto-electronic conversion, deliver separated electrical signals which serve, after amplification and further conversion into optical signals, for the plotting of a temperature-entropy diagram. In this manner, through a linear arrangement there are concurrently scanned by n-receiving cells, n-terrain sectors. In contrast to a method employing a single receiver element, this enables a reduction in the mirror rotation by a factor of $1/n$. Concurrently, the dwell time for each surface portion of the terrain sector becomes $n$-times larger. Inasmuch as the temperature resolution is proportional to the dwell time, through this method there may be obtained a considerably higher temperature resolution as compared with a method and system operating with only a single receiver cell. In other words, the chances of obtaining a satisfactory surveillance by means of this method are thereby considerably improved.

In the last described method, the scanning unit possesses a predetermined viewing angle $\omega$, and divides the overflow terrain into strips extending transversely to the direction flight, and which are sequentially scanned from one side to the other. Since the terrain sectors are scanned by means of a rotating prism or mirror system, and the distance from the flying missile to the individually scanned surface elements of the terrain sectors from the middle portion thereof increases outwardly, due to the constant viewing angle $\omega$, there concurrently increases the width of the surface portions reached by the scanning apparatus. The terrain sector scanned by the surveillance apparatus during a complete pivotal motion of the prism or mirror system, consequently does not have a rectangular shape, but the shape of a strip which is narrower in its middle portion and which widens toward the ends thereof.

If it were possible to observe or scan the terrain sectors through the aid of a pivotable optical system, with the simultaneous variation of the focal width with the scanning angle, so that they would have constant widths along their entire length, it would be possible to select the angular velocity of the pivotal motion with respect to the velocity or speed of the flying missile and its flying altitude, whereby the observed terrain sectors would be immediately adjoining. Since the observed or scanned terrain sectors do, however, widen outwardly from the middle thereof, it is advantageous that the scanning velocity be coordinated with the flying speed and the flying altitude so that the scanned terrain sectors contact each other at their narrowest locations. If, however, the terrain sectors are scanned in the above-described manner, they are partly superimposed on the outermost wider surface portions. In order to obtain an undistorted and clear reproduction of the temperature-entropy diagram on the recording film, an employable method is known from the German laid-open Specification No 1,623,426 which is however, relatively expensive, so that the number of portions in the line scanning arrangement are limited to only a few, in order to maintain the technical requirements within practical limitations.

The advantage of the IR-line-scanning apparatus having a line arrangement of n-single cells consists of in that either the geometric resolution or the temperature resolution, or both, are improved. A drawback lies, however, in that the cutting-across of the individual scanned edge regions if no measures are taken to effect optical correction, which would complicate the apparatus and reduce the dependability of the system.

The utilization of detector line scanning arrangements is required in gemometrically and thermally high-resolution line scanning apparatuses, since the utilized sensors possess finite time constants, in effect, in order to obtain the highest degree of sensitivity a predetermined dwell time is required. This dwell time can only be maintained if, upon an increase of the geometric resolution and temperature resolution, there are simultaneoulsy scanned a plurality of terrain sectors by means of a line sensor. The presently employed apparatuses, and those in the development stages, do not allow in a view of the required optical correction, any conversion of single into line sensors in order to obtain an incrase in the operating capacity.

SUMMARY OF THE INVENTION

Accordingly, it is an object of the present invention to provide for geometrically and thermally high-resolution line scanning apparatuses, notwithstanding their use of known specific sensors with finite time constants, the attaining of a high degree of sensitivity and to furthermore create the possiblity to allow for the conversion of an apparatus having a single sensor for the purpose of an increase in its capability, without any extensive requreiments.

This task is inventively effected, while obviating the aforementioned disadvantages, in that the detector lines are arranged so as to extend in parallel with the scanning direction, and in which there are provided between the individual detectors suitable connecting means in the form of delay elements. Of particular advantage herin lies that all presently available apparatuses having single detectors may be converted without the need for an optical corrector or mechanical reconstruction, inasmuch as the detector line scanner retains, as in an individual detector, the time constants $\tau_E/n$, which means that the scanning speed may be simplified with respect to a single-cell apparatus, and thereby also the geometrical resolution. The indivdual detector elements may be designed for varied spectral regions, and the delay elements be provided with a constant or variable delay time.

Preferably, the delay time of all the delay elements may be adjusted by means of a single control mechanism.

In accordance with further inventive characteristics, the delay time may be correlated with the scanning speed of the optical system, or the latter with the delay time of the detector line scanner. In the event of failure of a detector, for example through a short circuit or idle run, there is some reduction, however, a complete failure as in the instance of single-cell apparatuses is no longer possible.

BRIEF DESCRIPTION OF THE DRAWINGS

In the following description and the drawing there is described, in greater detail, an exemplary embodiment of the invention, and in which.

DETAILED DESCRIPTION

Figure 1:
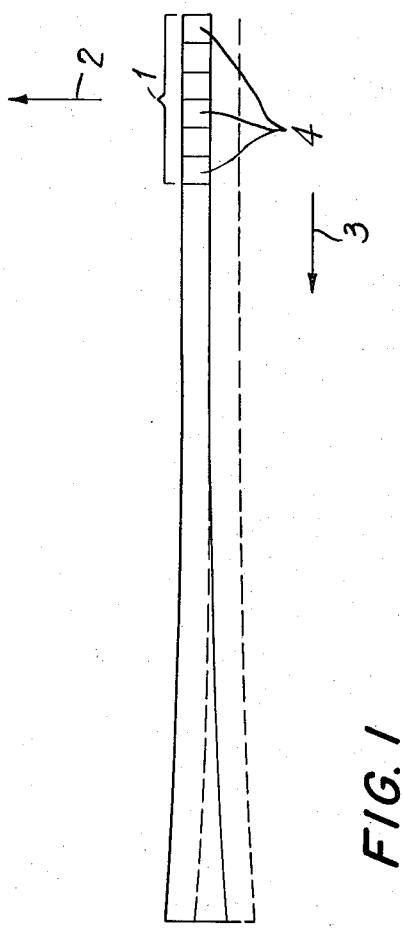
FIG. 1 is a diagrammatic illustration of two terrain sectors including a detector line scanner extending in parallel with the scanning direction for the sectors.
Figure 2:
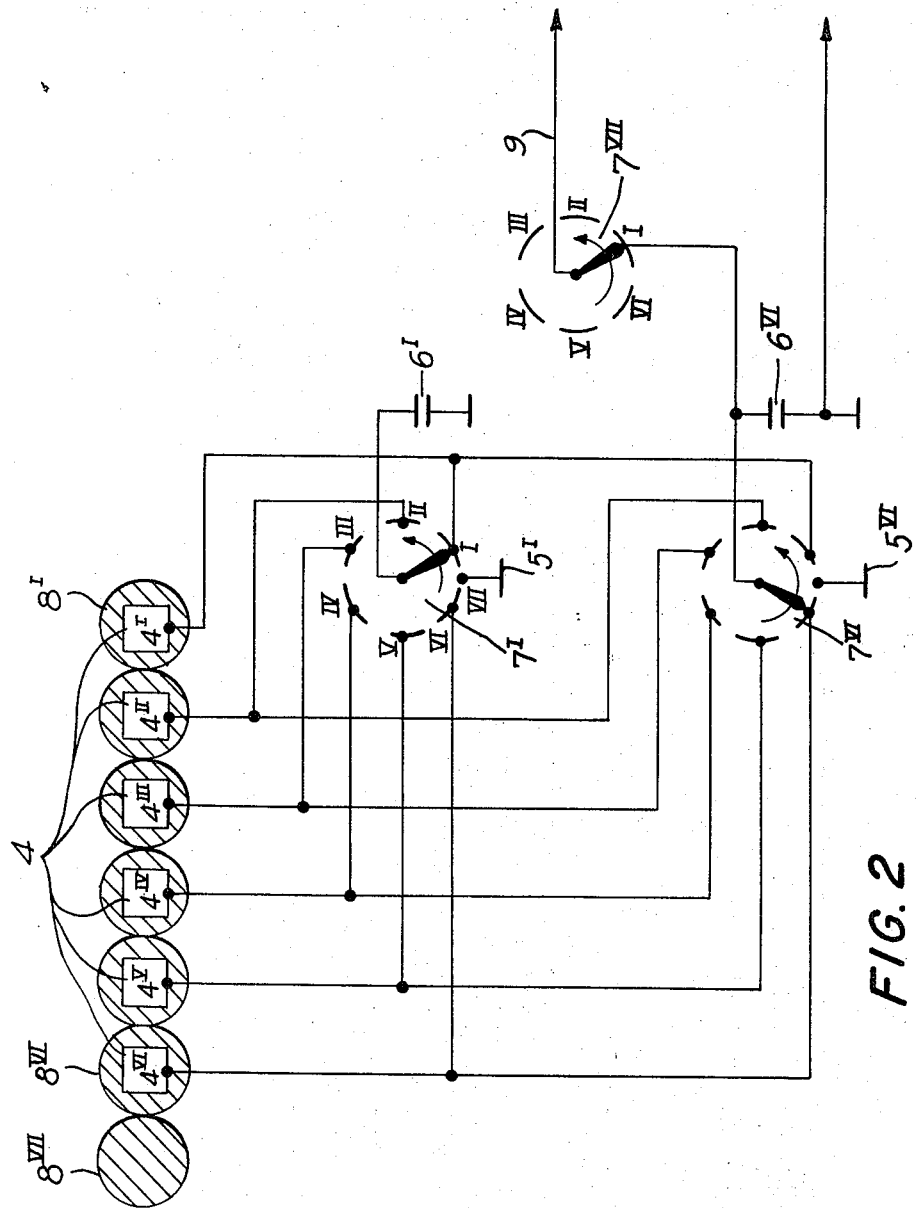
FIG. 2 is a detector line scanner pursuant to FIG. 1, whose individual signals are interconnected with each other through integrated suppliers.

The inventive process utilizes a detector line scanning arrangement 1 having n detectors 4, which extend perpendicular to the flight direction 2 and parallel to the scanning direction 3 in the image field of the IR-objective system (FIG. 1). The single detectors 4 provide for equal measurements. At the locations of the variable delay elements there may be applied, since this is simply effected, suitable storage condensors $6'$ through $6^{VI}$ (FIG. 2), which may be charged by signals through electronic ring or closed-circuit switches $70'$ through $7^{VI}$ having switch contacts I through VII, and whose charges may be withdrawn a corresponding delay. In order to provide a better overall view in the drawing, there are illustrated only the storage condensors $6'$ and VI, as well as the electronic ring or closed-circuit switches $7'$ and $7^{VI}$.

At any point in time, the detector $4'$ is connected with the storage condenser $6'$ through the electronic ring switch $7'$, whereby the storage condensor is charged by the signal of the detector $4'$ which is derived from the scanning element $8'$. If the detector row moves across the image field from left towards the right, there may be attained through suitable rotational speed of the switch contact of $7'$, that in the instant in which the detector $4''$ coincides with the scanning element $8'$, the signal of this detector is conveyed to the storage condensor $6'$ through the ring switch $7'$, and so forth, until after five stepping switch steps the signal of the detectors $4^{VI}$, which is then present on scanning element $8'$, is conveyed to the storage condensor $6'$. At that instant of time, the synchronously moving ring switch $7^{VII}$ is also located on the switch contact position VI, so that the sum of the currents from the detectors $4'$ through $4^{VI}$, resulting from the herein considered scanning element $8'$, is produced at the output 9. Herein it must be mentioned, that the charging period of the condensors there are provided series resistances (not shown), through whose intermediary there is achieved an integrating effect.

At the same moment in time, in which the detector $6'$, the storage condensor $6^{VI}$ which receives the summed signals of the detectors $4'$ through $4^{VI}$ for the scanning element $8^{VI}$, is connected to the output 9 through the ring switch $7^{VII}$. The not illustrated storage condensors $6^{II}$ through $6^{V}$ deliver the corresponding summed signals of the intermediately positioned scanning elements, which at the correct time intervals communicate with the contacts II through V on the ring or closed-circuit switch $7^{VII}$.

After completion of each summing sequence and its discharge, the respective storage condensor is unloaded or discharged through the switch contact VII on the ring switches $7'$ through $7^{VII}$ pursuant to the respective measuring points $5'$ through $5^{VI}$, so as to be prepared for the integration and storage of the signals of the successive scanning element.

By suitably selecting the step speed it becomes possible to scan the terrain, without loss of sensitivity, n-times as quickly as in the case of using of a single detector, since for n-detectors each scanned element is also detected over an $n$-time period, whereby no band width increase takes place.

The same inventive method may also be applied to the so-called thermal-entropy diagram apparatuses, which possess upon occasion as stationary apparatuses either a single detector which scans the image field of an IR-objective system strip-wise in two directions, or a detector line scanning arrangement in which the line is located so as to extend in parallel with the scanning direction.

While there has been shown what is considered to be the preferred embodiment of the invention, it will be obvious that modifications may be made which come within the scope of the disclosure of the specification.

What is claimed is:

1. In an opto-electronic method for the scanning of terrain profiles and the plotting of the temperature distribution over terrain sectors, including the forming of a temperature-entropy diagram with the aid of a line scanning detector arrangement, the improvement comprising; arranging a plurality of separate detector elements to extend in parallel with the scanning direction across said terrain sectors; and effecting operative connections between individual detector elements at predetermined time delays for scanning said sectors in synchronous sequence.

2. A method as claimed in claim 1, comprising adapting said individual detector elements for varied spectral ranges.

3. A method as claimed in clalim 1, comprising imparting a constant delay time to said relay means.

4. A method as claimed in claim 1, comprising imparting variable delay times to said delay means.

5. A method as claimed in claim 1, comprising imparting a predetermined delay time to said delay means through a single adjusting mechanism.

6. A method as claimed in claim 1, comprising adjusting the delay time of said delay means to the scanning speed of an optical system.

7. A method as claimed in claim 1, comprising adjusting the scanning speed of an optical system to the delay time of said scanning detector.

8. A method as claimed in claim 1, comprising forming said operative connections between said detector elements so that failure of one said detector element in a line, an electrical signal from a preceding detector element is conveyed to a subsequent detector element.

9. A switching arrangement for the opto-electronic scanning of terrain profiles and the plotting of the temperature distribution over terrain sectors; comprising line scanning detector means including individual detector elements adapted for different spectrum ranges for forming a temperature-entropy diagram of said terrain sectors; a plurality of time delay means; a plurality of closed-circuit switch means connected with respectively a corresponding number of said detector elements operatively inter-connecting said detector elements with said plurality of time delay means; and further synchronously operating closed-circuit switch means connecting said detector means to the output of said switching arrangement.

10. An arrangement as claimed in claim 9, said time delay means comprising storage condensers; and series resistances connected to said condensers during periods of charging of the latter, said charging being in response to time-delayed dischargeable signals generated from said detector means.

11. A switching arrangement as claimed in claim 9, said further synchronously operating closed-circuit switch means comprising a ring switch, and said plurality of switch means being each formed of a ring switch.

12. A switching arrangement as claimed in claim 9, the delay time of said time delay means and the terrain sector being correlatable to the scanning velocity of the optical arrangement; and adjusting means for conjointly setting the delay time and terrain sector line.

13. A switching arrangement as claimed in claim 9, said time delay means having a constant delay time.

14. A switching arrangement as claimed in claim 9, said time delay means having a variable delay time.

15. A switching arrangement as claimed in claim 9, said plurality of switch means interconnecting said detector elements being adapted, upon failure of one said detector element in a sector, to transmit the electrical signal from a preceding to a subsequent detector element.

* * * * *